(12) United States Patent
Magnani

(10) Patent No.: US 9,630,643 B2
(45) Date of Patent: Apr. 25, 2017

(54) MOBILE RECREATIONAL STRUCTURE TO SIMULTANEOUSLY TRANSPORT AND SECURE SEVERAL CHILDREN UP TO THIRTY SIX MONTHS, IN THE CUSTODY OF ONE ADULT, IN CASE OF FIRE OR EARTHQUAKE

(71) Applicant: Nicoletta Magnani, Bologna (IT)

(72) Inventor: Nicoletta Magnani, Bologna (IT)

( * ) Notice: Subject to any disclaimer, the term of this patent is extended or adjusted under 35 U.S.C. 154(b) by 0 days.

(21) Appl. No.: 14/902,576

(22) PCT Filed: Jul. 7, 2014

(86) PCT No.: PCT/IB2014/062918
§ 371 (c)(1),
(2) Date: Jan. 3, 2016

(87) PCT Pub. No.: WO2015/004592
PCT Pub. Date: Jan. 15, 2015

(65) Prior Publication Data
US 2016/0176431 A1    Jun. 23, 2016

(30) Foreign Application Priority Data

Jul. 9, 2013    (IT) .............................. BO2013A0353

(51) Int. Cl.
| | | |
|---|---|---|
| *B62B 9/14* | (2006.01) | |
| *B62B 9/24* | (2006.01) | |
| *B62B 7/00* | (2006.01) | |
| *B62B 9/00* | (2006.01) | |
| *B62B 3/00* | (2006.01) | |

(52) U.S. Cl.
CPC ............... *B62B 9/14* (2013.01); *B62B 3/007* (2013.01); *B62B 7/008* (2013.01); *B62B 9/00* (2013.01); *B62B 9/24* (2013.01); *B62B 9/005* (2013.01)

(58) Field of Classification Search
CPC .. B62B 9/00; B62B 9/14; B62B 9/142; B62B 9/24; B62B 9/005; B62B 3/007; B62B 7/008
USPC ............ 280/47.34, 47.38, 79.11, 79.2, 87.01
See application file for complete search history.

(56) References Cited

U.S. PATENT DOCUMENTS

| | | | |
|---|---|---|---|
| 2,942,914 A | 6/1960 | Noot | |
| 5,447,354 A | 9/1995 | Delp | ............................ 296/104 |
| 6,454,340 B1 | 9/2002 | Miller et al. | ................... 296/104 |
| 6,881,506 B2 * | 4/2005 | Anderson | ................. B32B 7/08 135/116 |
| 8,925,252 B2 * | 1/2015 | Meager | .................... A62C 2/10 52/2.11 |
| 2003/0025301 A1 | 2/2003 | Banuelos, III | ................ 280/651 |
| 2010/0116696 A1 * | 5/2010 | Sudhakar | ................. B60D 1/07 206/216 |

(Continued)

FOREIGN PATENT DOCUMENTS

JP    WO 2013018872 A1 *    2/2013    ............... B63C 9/06

*Primary Examiner* — John Walters
(74) *Attorney, Agent, or Firm* — Fattibene and Fattibene LLC; Paul A Fattibene

(57) ABSTRACT

Recreational mobile structure for letting children play and for transporting and securing them while protecting them from falling objects, smoke and flames. The structure is also suitable to simultaneously fill the need of containing and entertaining children, as in a playpen, ensuring that they do not exit, and to store and transport toys.

3 Claims, 2 Drawing Sheets

(56) References Cited

U.S. PATENT DOCUMENTS

2012/0235372 A1    9/2012  Herlitz et al. ............. 280/47.38
2015/0342327 A1*  12/2015  Berkson ................... A45F 4/04
                                                          224/154

* cited by examiner

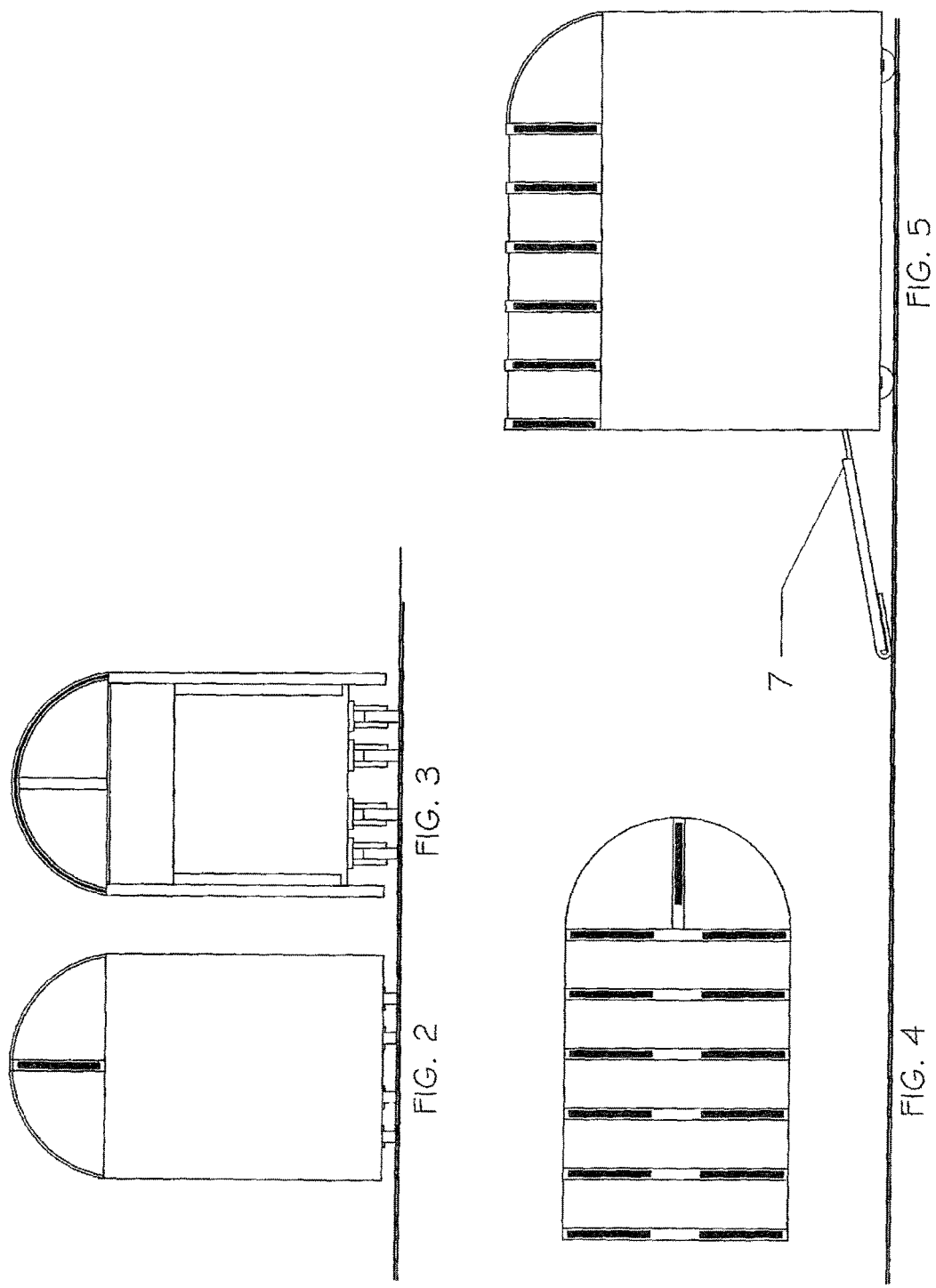

MOBILE RECREATIONAL STRUCTURE TO SIMULTANEOUSLY TRANSPORT AND SECURE SEVERAL CHILDREN UP TO THIRTY SIX MONTHS, IN THE CUSTODY OF ONE ADULT, IN CASE OF FIRE OR EARTHQUAKE

TECHNICAL FIELD

The present invention relates to the field of recreational and furnishing equipments in structures such as nurseries, day cares and games rooms in pediatric hospitals. In particular, the present invention relates to a recreational structure comprising wheels suitable to entertain and transport children up to 36 months, in a complete safe manner.

STATE OF THE ART

The need of having the following devices, inside structures that host children in the age range from 3 to 36 months, is known from the prior art:
1. small trucks for the transportation of children;
2. mattresses and containing toys, for example tubs;
3. containers to store toys, for example boxes.

No structures are known, that give the possibility to satisfy all these needs at the same time.

Tracks for the transportation of a children are known from the state of the art, but these do not have the security features needed in case of fire or earthquakes, because they are not provided with a covering structure.

Toys that can contain children (coaches, pillows, pools with little balls and others) are known as well, but they do not have wheels.

The proposed solution according to the present invention solves all these needs offering, by the use of a single object:
1. the possibility to transport and secure the children protecting them from falling objects and at the same time from fire and flames;
2. the possibility to contain and entertain them like in a playpen, ensuring that they cannot exit;
3. the possibility to contain and transport toys.

These aims are ensured using a mobile recreational structure in which children can play and can be transported and secured, and which also can contain and transport toys, having the features described, shown and claimed in the following.

SUMMARY OF THE INVENTION

The present invention relates to a mobile recreational structure to simultaneously transport and secure several children up to thirty six months, in the custody of one adult, in case of fire or earthquake.

According to an embodiment of the present invention, a mobile recreational structure is supplied which is constituted by a rigid base made of wood or of another suitable material, equipped with four or more wheels, two front wheels and rear wheels, arranged closely, made of polyurethane with a nuclei made of aluminum or another suitable material. One of the wheels, for example the right wheel behind, can be equipped with a security breaking system.

According to a further embodiment of the present invention, a mobile recreational structure is supplied which comprises a perimeter enclosed by a stiff structure realized as a woven metallic net and covered from the outside with a waterproof cloth.

According to a further embodiment of the present invention, a mobile recreational structure is supplied in which the inner part is protected by an easily washable padding made of non-toxic material, since it is the most likely to be in contact with the children. The padding can be put both on the sidewalls and at the bottom.

According to a further embodiment of the present invention a mobile recreational structure is supplied in which the supporting structure of the barrel vault covering is made of bars made of steel or another material resistant to compression so that these bars support a reinforced cloth constituted by carbon fibers or another suitable material.

According to a further embodiment of the present invention, a mobile recreational structure is supplied which contains a music box, which can be easily used by the children by pulling a string.

According to a further embodiment of the present invention, a mobile recreational structure is supplied in which the sidewalls are equipped with pockets so as to contain, for example, small recreational objects.

BRIEF DESCRIPTION OF THE DRAWINGS

FIG. 2 is a front elevational view of the recreational structure.
FIG. 3 is a rear elevational view of the recreational structure.
FIG. 4 is top elevational view of the recreational structure.
FIG. 5 is a side elevational view of the recreational structure.

DETAILED DESCRIPTION OF THE INVENTION

Figure 1:
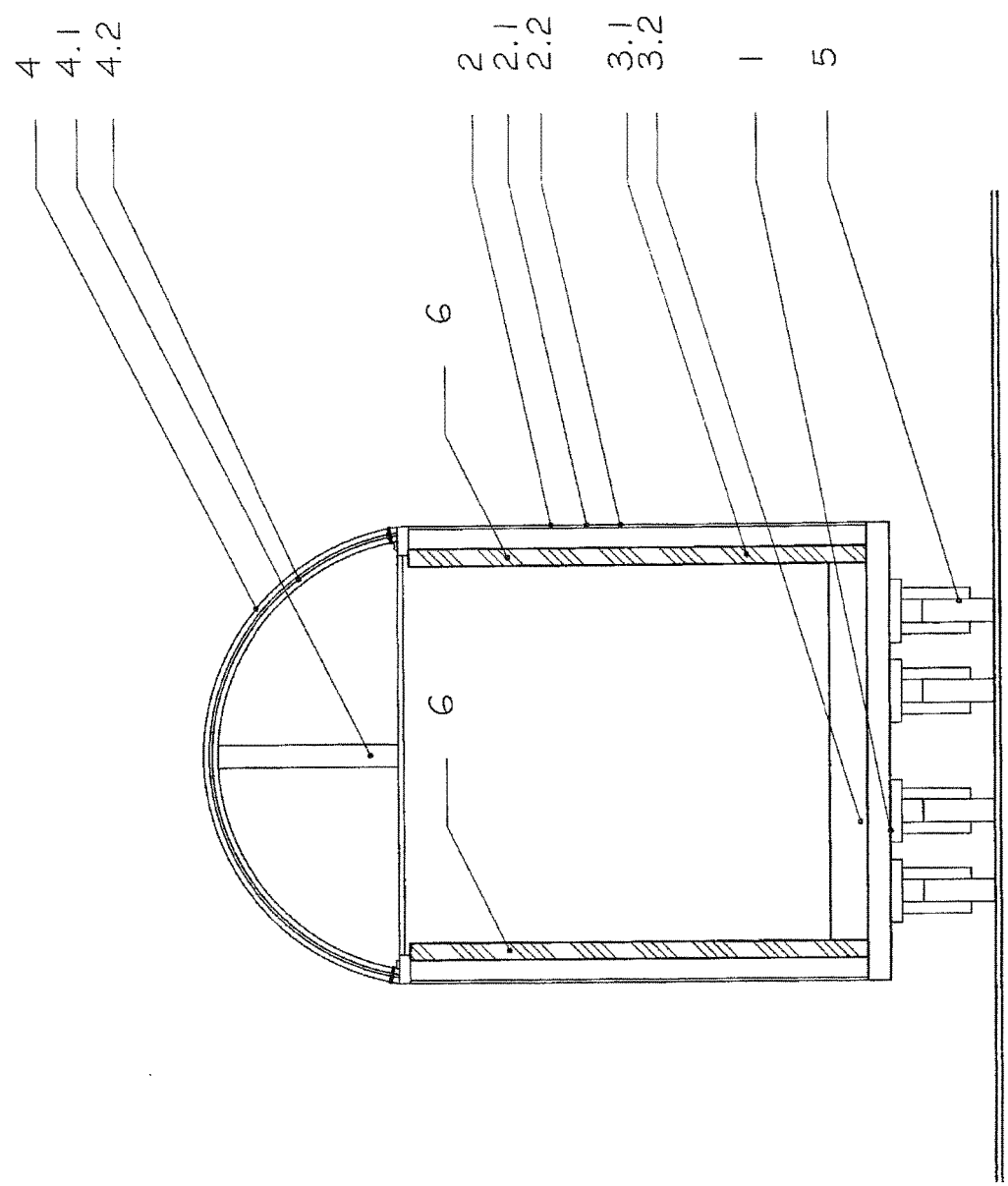
FIG. 1 is a cross-section of the recreational structure.

First of all it is necessary to think about the undeniable fact that a group of children up to 36 months is not able to save itself, for example, in case of fire or earthquake. Accordingly, an adult who has to deal with the emergency of escaping from fire or trying finding a safe place during an earthquake and has to take care of more than two small children, for example, up to 36 months, does not have the possibility to save all of them and to save himself.

According to the state of the art, there is no "wagon" able to transport children quickly to a safe place in order to escape from a fire nor is there a structure under which the adult and the children can protect themselves from falling objects.

Therefore, the extraordinary and exceptional use of this mobile recreational structure is that of being used as a transportation mean for children in case of fire and that of being used as a shelter for the children and the adult in case of an earthquake.

In case of fire, the adult quickly introduces all the children belonging to the group inside the mobile recreational structure, then he lifts up from the ground the rear door, which has been previously used as a ramp and he puts it into place using magnets. At this point, with the mobile recreational structure closed, he unlocks the wheels with his foot and quickly walks through the exit pushing from behind the mobile recreational structure and looking, at the same time, at the children inside it, eased along the way by the curved front part of the mobile recreational structure.

In case of an earthquake, the adult introduces the children into the mobile recreational structure pushing them toward the front part, then he himself enters into the structure, closes the rear door and remains inside with the children until the end of the earthquake. Afterwards the adult exits and brings the children safely outside the building carrying them inside the mobile recreational structure.

It has to be hoped that the use in case of earthquake or fire is extraordinary, but it must not been underestimated that this use could be the only possibility of salvation for the children and the adult in case of tragic events.

There is, in any case, the possibility of using the mobile recreational structure daily, by using its containing and transporting functions.

The structure can be used to secure some children, while the adult pays attention to only a child or during cleaning activities; it can also be used as a special bed for a child that needs to be taken under particular control; it can become a cozy place for reading tales to the smallest children; it can be used to temporary store the objects that the children must not see or reach; it can be used as a transportation means for children outside buildings and also, for the smallest, for moving them inside buildings; it can be the first location game for the children that are already walking and can go inside and outside in an independent way and can play inside it.

The invention is now described in a detailed manner with reference to the Figures of the attached drawings, which represent a non-limiting example.

FIG. 1 shows a cross-section of the recreational structure.

The structural part is made up by a rigid base 1 made of wood or another appropriate material, supported by four or more wheels 5.

The perimeter is closed by a rigid structure 2 that can be a woven metallic net 2.1 and can be covered from the outside with a waterproof cloth 2.2.

Inside it is protected by an easily washable padding made of a non-toxic material since it is the most exposed to the contact with the children. The padding is both on the side walls 3.1 and on the bottom 3.2.

The supporting structure of the barrel vault covering 4 is made of bars made of steel or another compression resistant material which hold a reinforced cloth 4.2 made of carbon fibers or another suitable material.

It is equipped with four or more wheels, two in front and two nearby behind, made of polyurethane with a nuclei made of aluminum or another suitable material. The rear right wheel is provided with a breaking security system.

A music box, easily activated by the children using a rope, can be placed inside and the side walls 6 can be equipped with pockets to store small recreational objects.

All the materials used to produce the structure are, of course, made of fire resistant material, suitable to be used inside a school or a hospital, moreover the structure has to be free of small objects or blunt objects so that it can be freely used also by children under 36 months of age.

FIGS. 2, 3, 4 and 5 show different views of the structure respectively, from the front, from behind, laterally and from above.

In the above-cited Figures, it can be noted that the mobile structure is closed on the sides and on the front in a round shape.

In FIG. 5, it can be noted that the structure can be opened from the rear side using a door which, being hinged on the bottom, can be opened in a complete way, transforming itself into a sliding ramp 7.

The front part has a round shape so as to make the passage through small paths, such as doors or corridors, easier.

Every single detail of the attached Figures is indicated with the following numbers.
1. rigid base
2. side closing
2.1. metallic net
2.2. waterproof cloth
3.1. side padding
3.2. bottom padding
4. barrel vault covering
4.1. metallic bars
4.2. protective cloth
5. wheels
6. equipped soft walls
7. opening and sliding door It is specified that the suggested dimensions are of about 150 cm in length×80 cm in width×140 cm in height but this can be varied according to the needs of the market. The proportions and the dimension of the structures of the various technical components can be varied and also the materials can be varied according to different technological needs.

It should be noted, in any case, that the present invention is not limited to the embodiments previously described and shown in the drawings. On the contrary, all the variations and modifications of the present embodiments that are clear to the person skilled in the art, are to be considered protected by the present invention.

The invention claimed is:

1. A recreational mobile structure to simultaneously transport and secure several children up to thirty six months old, in the custody of one adult, in case of fire or earthquake comprising:
   a rigid base;
   at least four wheels attached to said rigid base;
   a brake placed on at least one wheel;
   a bottom attached to said rigid base;
   a rigid structure extending from said rigid base, said rigid structure having two opposing planar sides and a front curved side connecting the two opposing planar sides, whereby an open rear is formed;
   a metal frame having a vaulted shape extending over said rigid base and attached to the two opposing planar sides of said rigid structure;
   a rounded front metal bar attached to said metal frame and the front curved side;
   a reinforced fireproof barrel vault covering placed over and attached to said metal frame, the rounded front metal bar, the two opposing planar sides, and the front curved side, whereby a protective fireproof covering is formed;
   a hinged rear door attached to the rigid base placed within the rear opening, wherein said hinged rear door when lowered forms a ramp;
   sidewalls placed adjacent said rigid structure, said sidewalls forming a soft interior wall; and
   pockets formed in said sidewalls, whereby recreational objects may be placed for children,
   whereby several children can be secured and transported safely in an emergency by one adult.

2. A recreational mobile structure to simultaneously transport and secure several children up to thirty six months old, in the custody of one adult, in case of fire or earthquake as in claim 1 wherein:
   said reinforced fireproof barrel vault covering comprises a reinforced cloth made of carbon fibers.

3. A recreational mobile structure to simultaneously transport and secure several children up to thirty six months old, in the custody of one adult, in case of fire or earthquake as in claim 2 wherein:
   said rigid structure comprises woven metallic net covered with a waterproof cloth.

* * * * *